US012559991B2

(12) United States Patent
Cordes et al.

(10) Patent No.: US 12,559,991 B2
(45) Date of Patent: Feb. 24, 2026

(54) MINIMALIST SECONDARY BARRIER

(71) Applicants: Airbus Operations GmbH, Hamburg (DE); Airbus Americas, Inc., Mobile, AL (US)

(72) Inventors: Frank Cordes, Stade (DE); John Brewster, Daphne, AL (US); Cary Brown, Mobile, AL (US)

(73) Assignees: Airbus Operations GmbH, Hamburg (DE); Airbus Americas, Inc., Mobile, AL (US)

( * ) Notice: Subject to any disclaimer, the term of this patent is extended or adjusted under 35 U.S.C. 154(b) by 91 days.

(21) Appl. No.: 18/371,829

(22) Filed: Sep. 22, 2023

(65) Prior Publication Data

US 2025/0101774 A1      Mar. 27, 2025

(51) Int. Cl.
| | |
|---|---|
| *E05B 77/44* | (2014.01) |
| *B64C 1/14* | (2006.01) |
| *E05B 85/22* | (2014.01) |

(52) U.S. Cl.
CPC ............ *E05B 77/44* (2013.01); *B64C 1/1469* (2013.01); *E05B 85/22* (2013.01)

(58) Field of Classification Search
CPC ............ Y10T 292/23; Y10T 292/0834; Y10T 292/084; Y10T 292/0843; Y10T 292/1031; E05C 9/04; E05C 9/021; E05C 9/041; E05B 41/00; E05B 85/22; B64C 1/1469
See application file for complete search history.

(56) References Cited

U.S. PATENT DOCUMENTS

| | | | | |
|---|---|---|---|---|
| 1,646,674 | A | * 10/1927 | Angelillo | ................ E05C 9/042 |
| | | | | 70/109 |
| 2,069,883 | A | * 2/1937 | Hennicke | ................ E05C 9/041 |
| | | | | 49/276 |
| 11,530,024 | B2 | 12/2022 | Brewster | |
| 2020/0198785 | A1 | 6/2020 | Kohlstette | |
| 2023/0036826 | A1 | 2/2023 | Brewster | |
| 2024/0159083 | A1* | 5/2024 | McGill | ................... E05B 49/00 |

FOREIGN PATENT DOCUMENTS

EP            3670328 A1      6/2020

* cited by examiner

*Primary Examiner* — Christine M Mills
*Assistant Examiner* — Yahya Sidky
(74) *Attorney, Agent, or Firm* — KDW Firm PLLC

(57)              ABSTRACT

Systems and methods for providing a barrier assembly that prevents access to a secure area can include a panel movable between an open position and a closed position in which the panel substantially obstructs a passageway, but where the panel width is less than the width of the passageway. A first locking pin is movable from a retracted position within the panel to an extended position protruding out of the top edge of the panel, and a second locking pin is movable from a retracted position within the panel to an extended position protruding out of the bottom edge of the panel. An actuator is on or within the panel and is configured to trigger extension of the locking pins to respective extended positions when the actuator contacts a stopper in the passageway. The barrier assembly can further prevent retraction of the locking pins for a predetermined time delay.

13 Claims, 10 Drawing Sheets

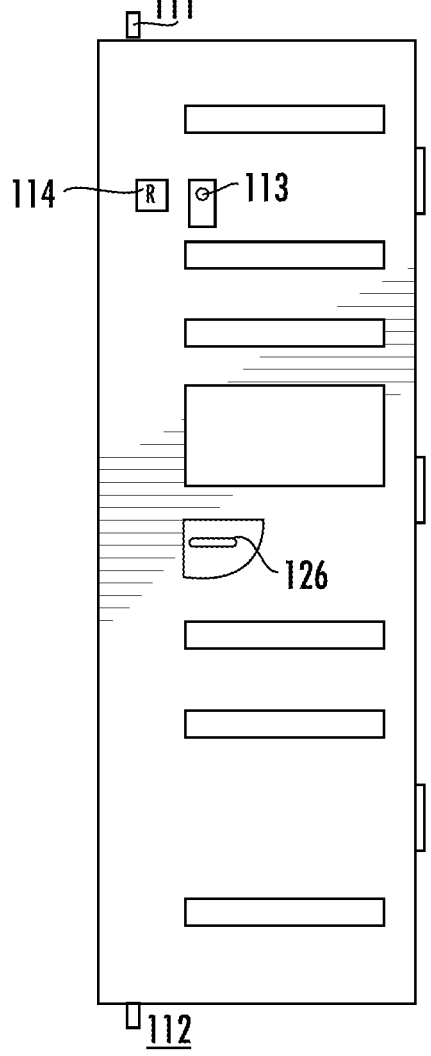
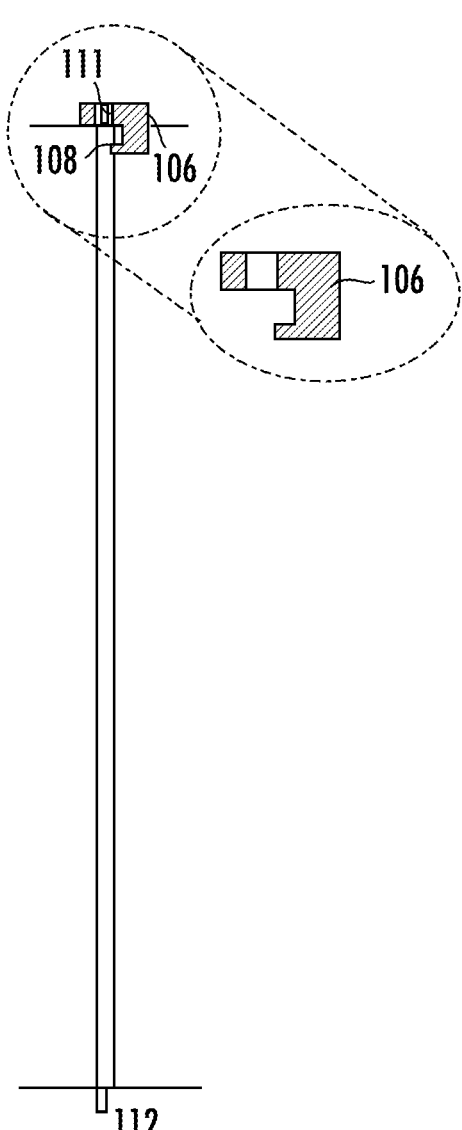
FIG. 2A                    FIG. 2B

MINIMALIST SECONDARY BARRIER

TECHNICAL FIELD

The subject matter disclosed herein relates generally to aircraft barrier system and methods, and an aircraft area as well as aircraft having such aircraft barrier system and methods. More particularly, the subject matter disclosed herein relates to an aircraft barrier system and method with a locking device having a release mechanism capable of delaying a movement of a latching clamp from a locking state to an unlocking state.

BACKGROUND

In recent years developments have been made to protect a secure area within an aircraft, such as a cockpit, from potential intruders and attackers. However, while a cockpit door provides a secure barrier between a cockpit and passenger cabin of the aircraft, the cockpit door needs to be opened occasionally, for example if a pilot requires to leave the cockpit (to go to a lavatory or galley) or if a flight attendant needs to enter the cockpit (e.g. to bring food to a pilot).

For such or similar situations, where the cockpit door is open for a short period of time, a second barrier is required, which hinders a possible attacker from entering the cockpit. Such a second barrier may not need to provide the same strength as the cockpit door, since it has to withstand a possible attacker only for the short period of time. On the other hand, a second barrier can only be provided within the passenger cabin, which decreases the space available for seating and other passenger purposes. Some proposed solutions provide a compact front section of an aircraft fuselage having a separation means including at least one mobile element suitable for being slid between an extended closing position in which said separation means defines, together with a door of a cockpit, a transition area between the cockpit and the passenger cabin, preventing persons from crossing between the passenger cabin and said transition area, and a retracted open position in which said separation means allows persons to cross between the passenger cabin and said transition area.

In many configurations, however, such separation means is bulky and may be cumbersome to open for the pilot or flight attendant.

SUMMARY

It is therefore an object of the invention to provide an aircraft barrier system and methods, aircraft area, and aircraft having a barrier system that is lightweight and unobtrusive but is also capable of delaying possible attackers from entering a secured transition area.

This object may be achieved by an aircraft barrier system and methods with features of one or more embodiments described herein, an aircraft area with the features of one or more embodiments described herein, and an aircraft with the features of one or more embodiments described herein.

In accordance with this disclosure, systems and methods for providing a secondary barrier to protect a secure area within an aircraft are provided. In one aspect, a barrier assembly configured to prevent access to a secure area is provided. The barrier assembly can include a panel movable between an open position and a closed position in which the panel substantially obstructs a passageway, wherein the panel has a width that is less than a width of the passageway.

A first locking pin can be movable between a retracted position within a top edge of the panel and an extended position protruding out of the top edge of the panel, wherein the first locking pin is configured to be secured in a first pin receiver arranged in an upper structural part of the passageway when in the extended position. A second locking pin can be movable between a retracted position within a bottom edge of the panel and an extended position protruding out of the bottom edge of the panel, wherein the second locking pin is configured to be secured in a second pin receiver arranged in a lower structural part of the passageway when in the extended position. An actuator can be arranged on or within the panel, wherein the actuator is configured to trigger extension of the first locking pin and the second locking pin to respective extended positions when the actuator contacts a stopper arranged in the passageway at a position corresponding to the panel being moved to the closed position.

In another aspect, a method for preventing access to a secure area is provided. The method can include moving a panel to a closed position in which the panel substantially obstructs a passageway, wherein the panel has a width that is less than a width of the passageway. In response to moving the panel to the closed position, the method can further include moving a first locking pin from a retracted position within a top edge of the panel to an extended position protruding out of the top edge of the panel, wherein the first locking pin is secured in a first pin receiver arranged in an upper structural part of the passageway, and moving a second locking pin from a retracted position within a bottom edge of the panel to an extended position protruding out of the bottom edge of the panel, wherein the second locking pin is secured in a second pin receiver arranged in a lower structural part of the passageway.

Although some of the aspects of the subject matter disclosed herein have been stated hereinabove, and which are achieved in whole or in part by the presently disclosed subject matter, other aspects will become evident as the description proceeds when taken in connection with the accompanying drawings as best described hereinbelow.

BRIEF DESCRIPTION OF THE DRAWINGS

The features and advantages of the present subject matter will be more readily understood from the following detailed description which should be read in conjunction with the accompanying drawings that are given merely by way of explanatory and non-limiting example, and in which:

FIG. 2A illustrates a front view of a secondary barrier assembly in accordance with an embodiment of the presently disclosed subject matter.

FIG. 2B illustrates a side view of a secondary barrier assembly in accordance with an embodiment of the presently disclosed subject matter.

DETAILED DESCRIPTION

The present subject matter provides systems and methods for providing a secondary barrier to protect a secure area within an aircraft.

Figure 1A:
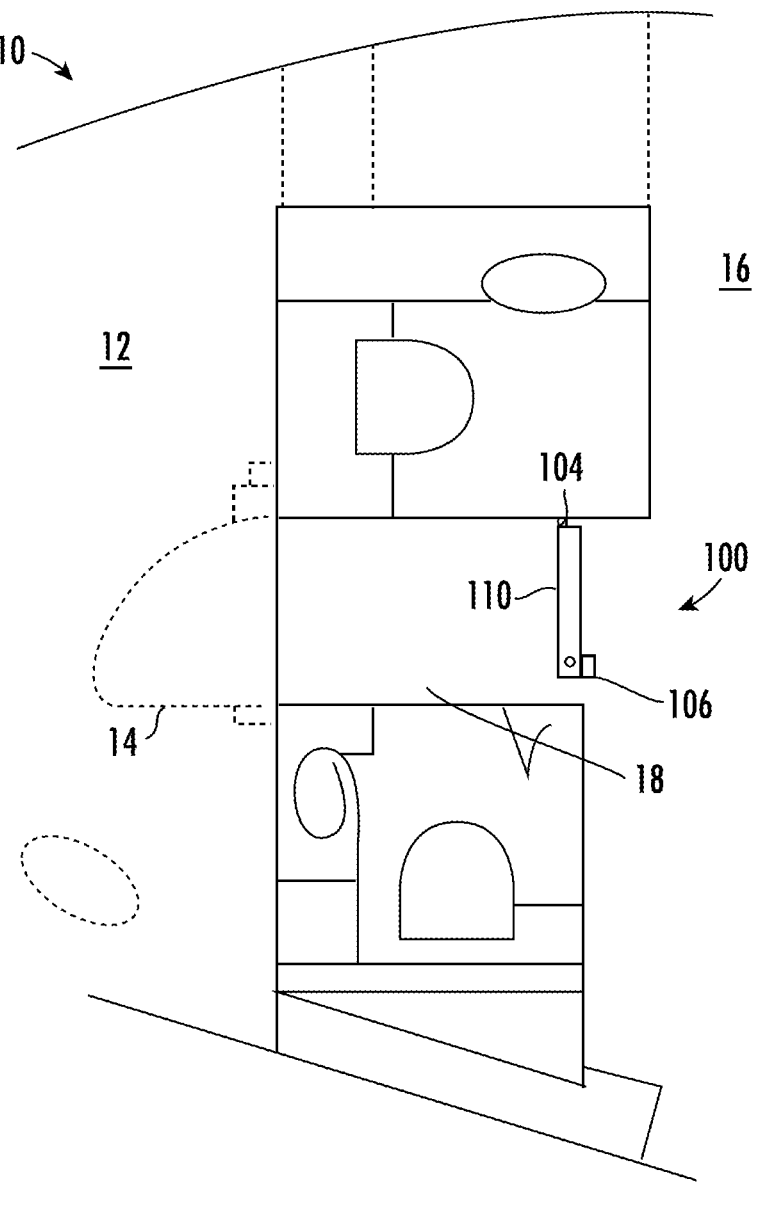
FIG. 1A illustrates a plan view of an aircraft configuration including a secondary barrier assembly in accordance with an embodiment of the presently disclosed subject matter.

In one aspect, the present subject matter provides a barrier assembly configured to prevent access to a secure area. As shown in FIG. 1A, for example, an aircraft, generally designated 10, can include a cockpit door 14 that provides a secure barrier between a cockpit 12 and a passenger cabin 16 of the aircraft 10. When it is desired to open the cockpit door 14 for a short period of time, a barrier assembly, generally designated 100, can be employed to provide a temporary secondary barrier between the cockpit 12 and the passenger cabin 16. In some common configurations, aircraft monuments/structures are arranged on both sides of a passageway 18 that connects the passenger cabin 16 to the cockpit 12. A monument may be a galley (or a portion thereof), a lavatory (or a portion thereof), and/or a partition (wall) (or a portion thereof) arranged inside the passenger cabin 16. For example, the monument or at least the portion thereof is arranged parallel to a bulkhead or other wall separating the cockpit 12 from the passenger cabin 16. As shown in FIG. 1A, the barrier assembly 100 can be arranged within the passageway 18 to obstruct access to the cockpit 12 from the passenger cabin 16.

Figure 1B:
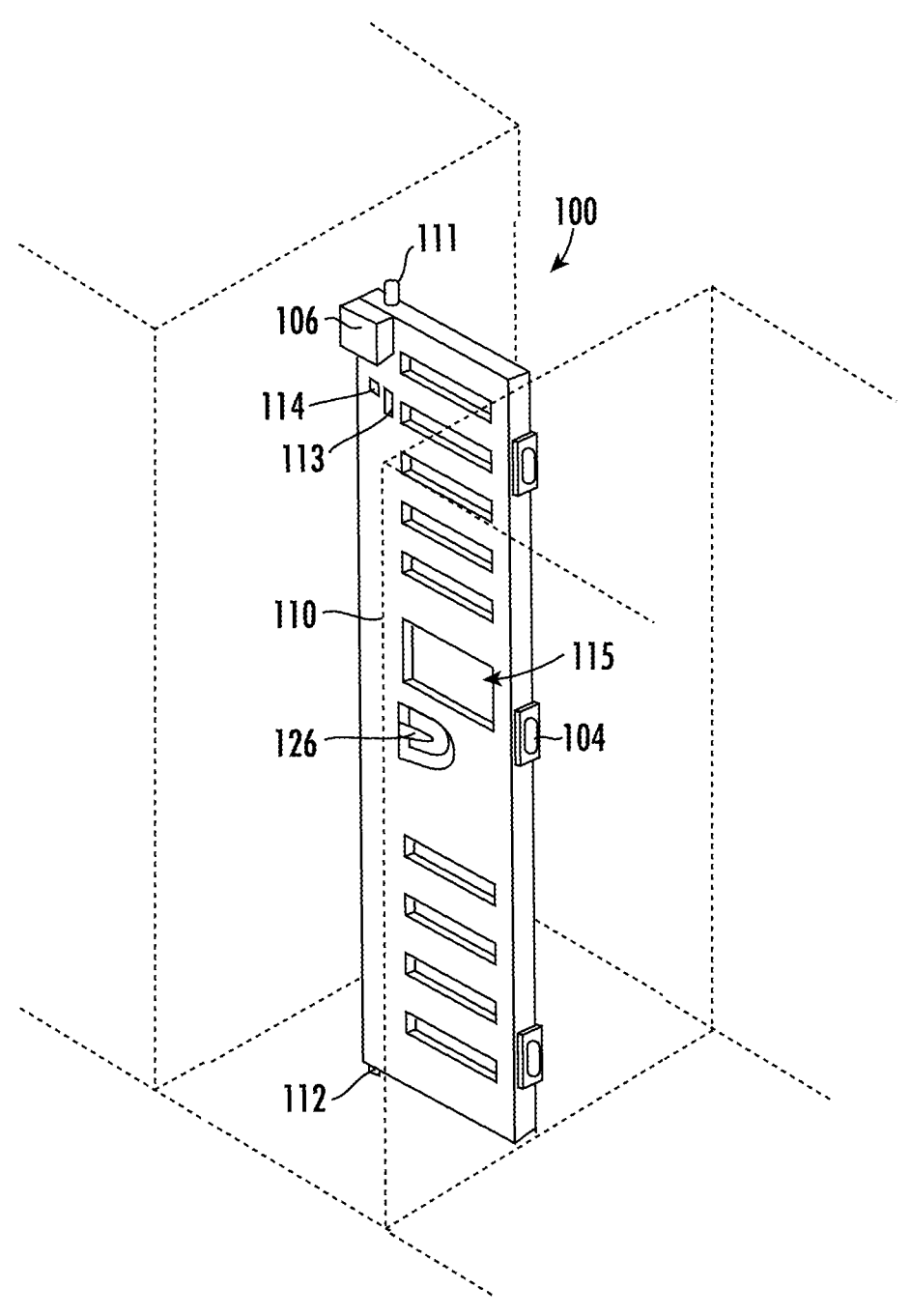
FIG. 1B illustrates a side perspective view of a secondary barrier assembly in a closed position in accordance with an embodiment of the presently disclosed subject matter.

Referring to FIGS. 1A and 1B, the barrier assembly 100 assembly includes a panel 110 movable to a closed position in which the panel 110 substantially obstructs the passageway 18, but where the panel 110 has a width that is less than a width of the passageway 18. In some embodiments, for example, the panel 110 is hingedly (e.g., rotatably and/or pivotably) connected to a wall/monument adjacent to the passageway 18, such as by one or more hinge 104. The one or more hinge 104 can be separable or fixedly attached to the panel 110. In some embodiments, the one or more hinge 104 is fixedly attached to the wall/monument adjacent to the passageway 18, for example, by a plurality of fasteners, with the panel 110 then being removably mountable to the one or more hinge 104 and, thusly, to the wall/monument adjacent to the passageway 18. In the example embodiment shown, the barrier assembly 100 includes three hinges 104, however, any number of hinges may be provided, accounting for the dimensions and mass of the panels 110, as well as the desired connection points to the adjoining structure/monument to ensure sufficient rigidity and/or security of the barrier assembly 100 to prevent unauthorized passage therethrough (e.g., by physically breaking down the barrier assembly 100 due to mechanical failure of the one or more hinge 104). Regardless of how the panel 110 is attached, the one or more hinge 104 defines an axis of rotation about which the panel 110 pivots between the closed position, in which the passageway 18 is at least partially obstructed, and the stowed position, in which the passageway 18 is substantially unobstructed. As used herein, the term "substantially unobstructed" should be understood to recognize the situation in which the thickness of the panel 110 and/or the lateral protrusion of the one or more hinge 104 into the opening, whichever is greater, will at least always be present to block that portion of the opening even when the barrier assembly 100 is in the stowed position, but this minimal obstruction is not significant enough to prevent routine passage through the passageway 18.

In some embodiments, when in the closed position, the panel 110 extends substantially across the passageway 18, but the panel 110 need not extend entirely across the full width of the passageway 18 to provide an effective barrier against unwanted entry though the passageway 18 and into the cockpit 12. In some embodiments, for example, the panel 110 can have a width that is up to about 18 cm less than a width of the passageway 18, or that is between about 15 cm and about 18 cm less than a width of the passageway 18, which can provide effective obstruction of the passageway 18 when deployed while minimizing the size of the panel 110 when stowed. This difference between the width of the panel 110 and the width of the passageway 18 averts any issues regarding tolerance compensation for the interface between the free edge of the panel 110 and the opposite wall/monument within the passageway 18.

Further in this regard, the barrier assembly 100 can be arranged within the passageway 18 at a distance from the cockpit door 14 selected such that intruders cannot merely reach beyond the panel 110 (i.e., around the gap remaining between the panel 110 and the opposing wall/monument of the passageway 18) to touch the cockpit door 14. For instance, in some embodiments, the barrier assembly 100 can be positioned such that the panel 110 in the closed position is spaced apart from the cockpit door 14 by a selected security distance. Further, in some embodiments, one or both of the width of the panel 110 and/or its position in the passageway 18 can be selected such that the panel 110 in its stowed position does not interfere with operation of the cockpit door 14. This position can depend at least in part on the width of the panel 110 selected based on the desired difference between the width of the panel 110 and the width of the passageway 18 (the smaller the gap size the shorter is the distance to the cockpit door).

In some embodiments, the panel 110 can include one or more opening 115 that is sized to allow passage of small items between the two sides of the panel 110. For example, in some embodiments, the one or more opening 115 is sized and configured to allow meal trays and/or beverages to be passed between the passenger cabin 16 and the cockpit 12 when the barrier assembly 100 is deployed. Alternatively or in addition, those having ordinary skill in the art will recognize that the principles disclosed herein are not limited to a panel 110 with or without openings but can further include any of a variety of frame structure that is configured to prevent access. Examples of such a frame structure can include but are not limited to a structural frame with netting, bars, wires, barrier tubes, grids, tapes, or other reinforcing structures.

When not needed to provide a secondary barrier to entry into the cockpit 12, the barrier assembly 100 can be configured such that the panel 110 is movable to an open position in which the passageway 18 is substantially unobstructed as discussed above. The narrow width of the panel 110 relative to the width of the passageway 18 ensures that only a correspondingly narrow portion of the space against the wall/monument that defines the passageway 18 is needed to accommodate storage of the panel 110 when in this open position. In addition, the narrow width of the panel 110 corresponds to a reduced weight compared to alternative secondary barrier solutions, reducing the equipment load on the aircraft 10.

Figure 1C:
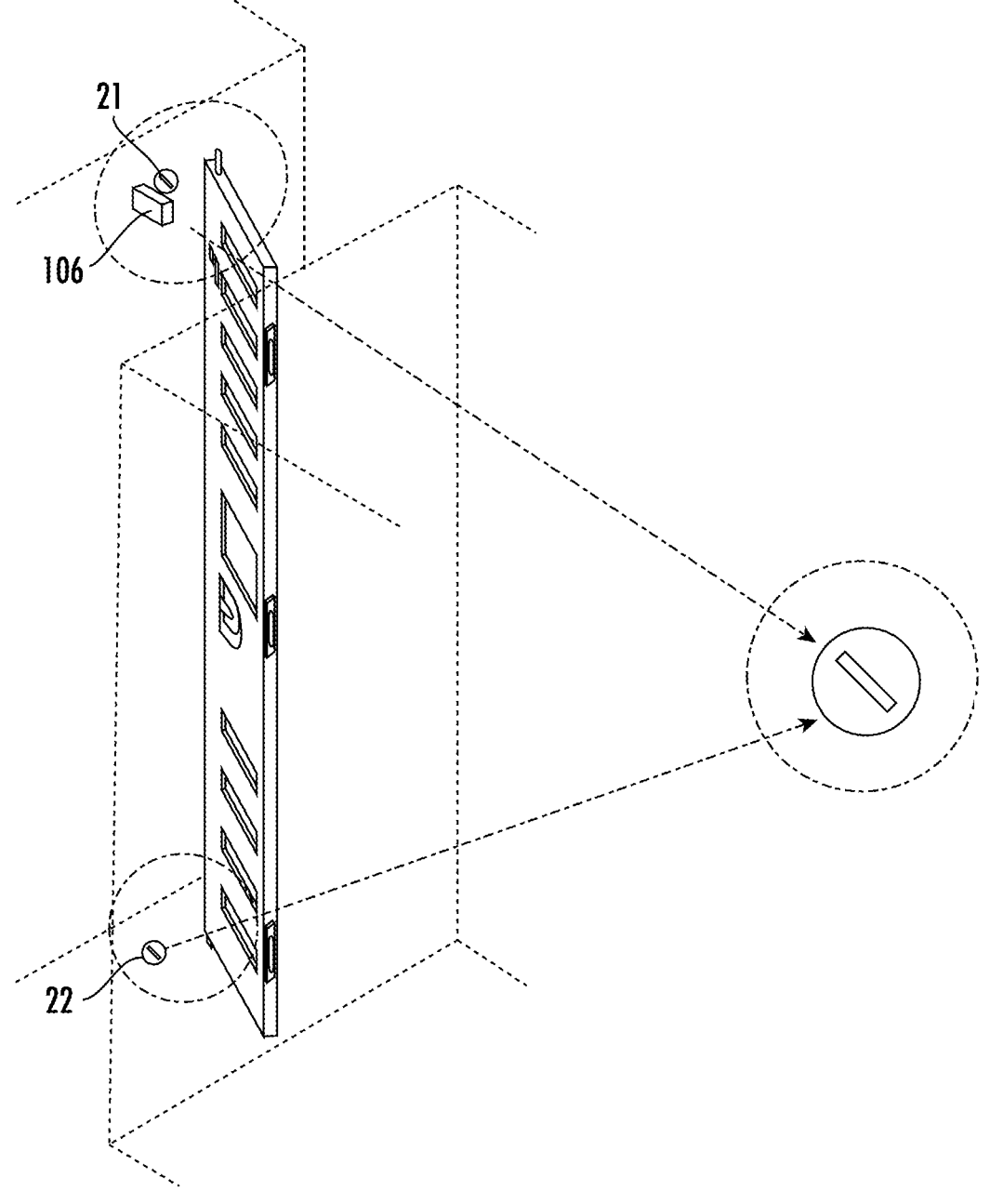
FIG. 1C illustrates a side perspective view of a secondary barrier assembly in an open position in accordance with an embodiment of the presently disclosed subject matter.

As discussed above, the panel 110 has a width that is less than a width of the passageway 18, and thus moving the panel 110 to a closed position does not require engagement with the opposing wall/monument in the passageway 18. As a result, the barrier assembly 100 can be installed and used regardless of the configuration of the opposing aircraft monument/structure. In this configuration, instead of interfacing with the opposing wall/monument, the barrier assembly 100 is configured to engage elements mounted above and below the panel 110 for securing the barrier assembly 100 in place for preventing access to the cockpit 12. In this regard, referring to FIG. 2A, the barrier assembly 100 includes a first locking pin 111 movable between a retracted position within a top edge of the panel 110 and an extended position protruding out of the top edge of the panel 110. Similarly, a second locking pin 112 is movable between a retracted position within a bottom edge of the panel 110 and an extended position protruding out of the bottom edge of the panel 110. As shown in FIG. 1C, the passageway 18 can include a first pin receiver 21 arranged in an upper structural part of the passageway 18 that is configured for receiving the first locking pin 111 when it is moved to its extended position. In some embodiments, for example, the first pin receiver 21 comprises an opening in the ceiling panel of the passenger cabin 16 and/or passageway 18 and is connected to a structural part which is either attached to the primary structure or to an adjacent monument. A second pin receiver 22 is arranged in a lower structural part of the passageway 18 (e.g., in the floor) and is configured for receiving the second locking pin 112 when it is moved to its extended position.

In some embodiments, the first pin receiver 21 and the second pin receiver 22 are configured to include an opening that is wider than the respective one of the first locking pin 111 or the second locking pin 112 to accommodate for static or dynamic tolerances of the aircraft cabin monuments and structures and/or to compensate for other deviations from alignment that may occur. In this regard, as shown in FIG. 1C, each of the first pin receiver 21 and the second pin receiver 22 can have a form of an elongated slot, although those having ordinary skill in the art will recognize that the first pin receiver 21 and the second pin receiver 22 can have any of a variety of other shapes and/or configurations corresponding to the shapes of the first locking pin 111 and the second locking pin 112, respectively.

In some embodiments, the extension of the first locking pin 111 and the second locking pin 112 from the panel 110 is automatically triggered by the panel 110 being moved to the designated closed position. As shown in FIGS. 1A-1C and 2B, a stopper 106 can be provided within the passageway 18 to define a stop position for the panel 110 within the passageway 18. In addition, in some embodiments, the barrier assembly 100 includes an actuator 108 arranged on or within a surface of the panel 110 at a position on the panel 110 that contacts the stopper 106 when the panel 110 is moved to the closed position. The actuator 108 is configured to trigger extension of the first locking pin 111 and the second locking pin 112 to respective extended positions when the actuator 108 contacts the stopper 106. Referring to FIG. 2B, in some embodiments, the stopper 106 can be integrated together with the first pin receiver 21. Although the stopper 106 is shown and described as being mounted at or near a ceiling of the passageway 18, those having ordinary skill in the art will recognize that the stopper 106 can be arranged in any of a variety of positions at which the stopper 106 can establish the desired closed position of the panel 110.

Figure 3A:
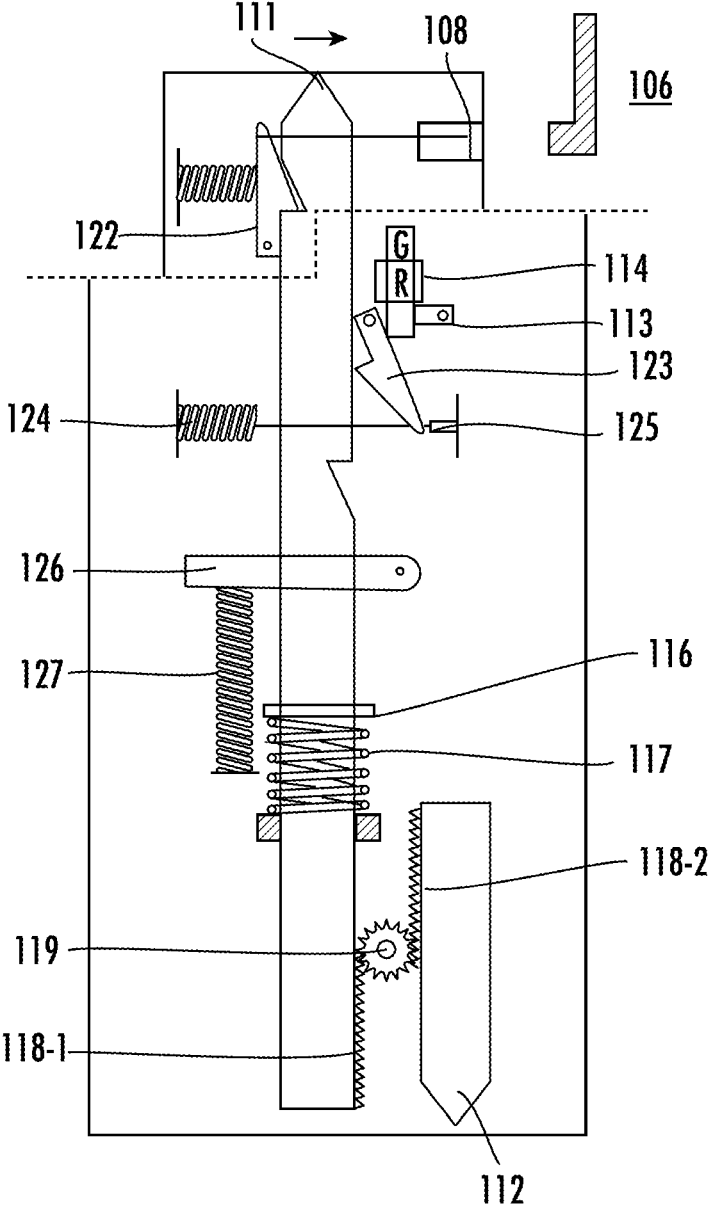
FIG. 3A illustrates a schematic representation of a locking mechanism of a secondary barrier assembly in an open-door position in accordance with an embodiment of the presently disclosed subject matter.

Referring to an embodiment shown in FIG. 3A, the panel 110 is shown in an open position such that the actuator 108 is spaced apart from the stopper 106. In this arrangement, a release latch 121 coupled to the actuator 108 is arranged in an engaged position in which the release latch 121 engages a notch in the first locking pin 111, holding the first locking pin 111 in the retracted position. In other embodiments, such as in configurations in which the stopper 106 is arranged at or near a floor of the passageway 18, and thus the actuator 108 is arranged near a bottom of the panel 110, the release latch 121 can be configured to engage the second locking pin 112. In some embodiments, the release latch 121 can be biased towards this engaged position, such as by connection to a release spring 122 (e.g., a compression spring), to prevent movement of the first locking pin 111 from the retracted position.

Figure 3B:
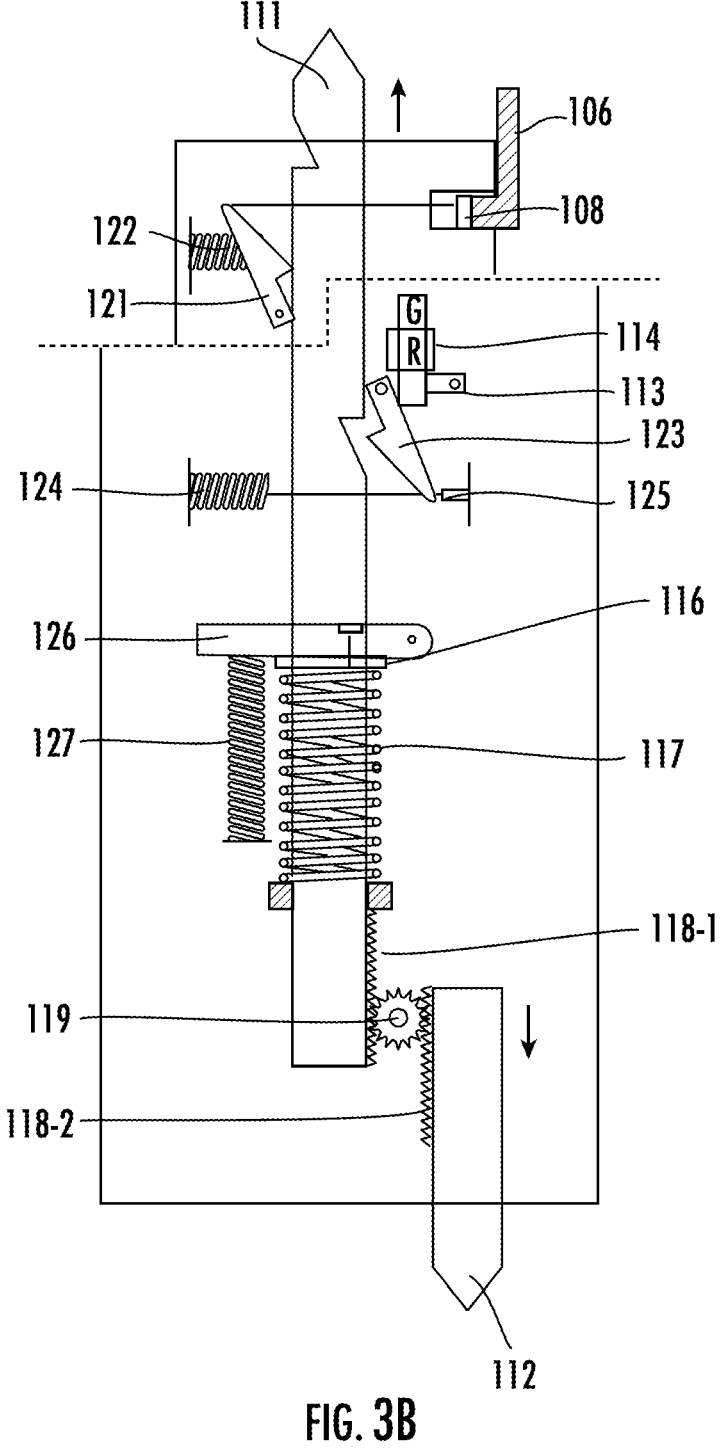
FIG. 3B illustrates a schematic representation of a locking mechanism of a secondary barrier assembly in a closed-door position in accordance with an embodiment of the presently disclosed subject matter.

Referring to FIG. 3B, when the panel 110 is moved to the closed position such that the actuator 108 contacts the stopper 106, however, movement of the actuator 108 causes a corresponding movement of the release latch 121 from the engaged position to a disengaged position (e.g., against the biasing action of the release spring 122) in which the release latch 121 is disengaged from the first locking pin 111. As a result, the first locking pin 111 is able to move from its retracted position towards the extended position. In some embodiments, this extension is assisted such that releasing the release latch 121 results in the automatic deployment of the first locking pin 111 and/or the second locking pin 112. As shown in FIG. 3B, in some embodiments, the first locking pin 111 is coupled to a pin flange 116, and one or more pin biasing element 117, such as a spring, is arranged and configured to apply a biasing force that urges the first locking pin 111 towards its extended position. When the first locking pin 111 is in a retracted position, the pin flange 116 compresses the pin biasing element 117. When the release latch 121 is moved to its disengaged position, the biasing force applied by the pin biasing element 117 acts on the pin flange 116 and thus on the first locking pin 111 to drive the movement of the first locking pin 111 to its extended position.

In some embodiments, this movement of the first locking pin 111 can further be translated to correspondingly cause the movement of the second locking pin 112 from its retracted position to its extended position. With continuing reference to FIG. 3B, the first locking pin 111 can include a first cog rail 118-1 that is meshingly engaged with a gear wheel 119 on one side of the gear wheel 119, and the second locking pin 112 can similarly include a second cog rail 118-2 that is correspondingly meshingly engaged with the gear wheel 119 on an opposing side of the gear wheel 119. In this arrangement, movement of the first locking pin 111 from its retracted position towards its extended position can cause the first cog rail 118-1 to translate relative to the gear wheel 119 (e.g., in a substantially upward vertical direction), causing rotation of the gear wheel 119, which imparts a force on the second cog rail 118-2 to correspondingly cause translation of the second locking pin 112 in a direction substantially opposite the direction of translation of the first locking pin 111 (e.g., in a substantially downward vertical direction). In this configuration, the biasing force applied by the pin biasing element 117 can act to extend both of the first locking pin 111 and the second locking pin 112 upon disengagement of the release latch 121 from the first locking pin 111. Although the disclosed embodiments show and describe this arrangement using the coupling of the first and second cog rails 118-1 and 118-2 via the gear wheel 119, those having ordinary skill in the art will recognize that any of a variety of other transferring mechanics can be used to coordinate the extension of the first and second locking pins 111 and 112.

Figure 3C:
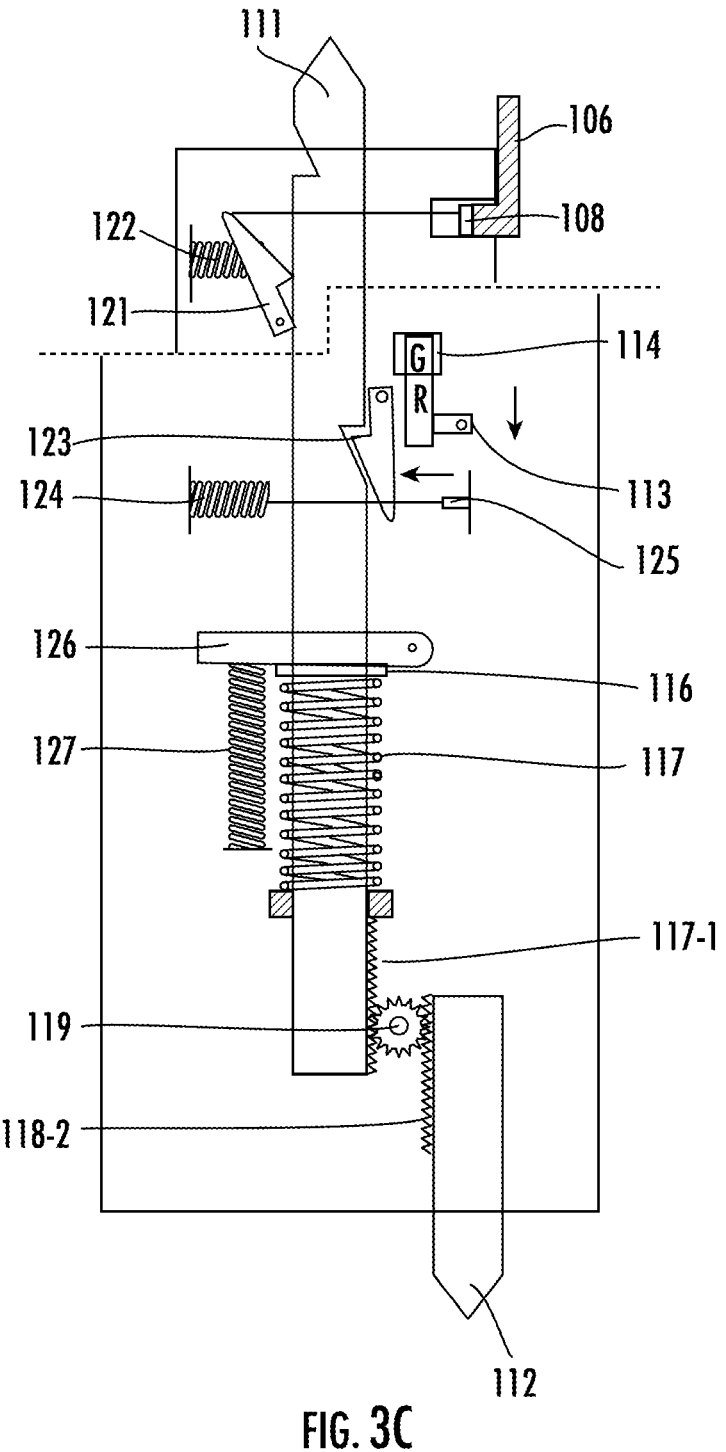
FIG. 3C illustrates a schematic representation of a locking mechanism of a secondary barrier assembly in a secured door position in accordance with an embodiment of the presently disclosed subject matter.

Referring to FIG. 3C, once the first and second locking pins 111 and 112 are fully extended (e.g., engaged with respective first and second pin receivers 11 and 12), the first and second locking pins 111 and 112 can be secured in their respective extended positions to hold the panel 110 in its closed position to secure the passageway 18. In some embodiments, a security latch 123 is movable from un unsecured position in which the security latch 123 is disengaged from the first locking pin 111 (See, e.g., FIG. 3B) into a secured position in which the security latch 123 engages the first locking pin 111 to hold the first locking pin 111 (and the second locking pin 112) in its extended position.

In some embodiments, the security latch 123 is biased towards its disengaged position by a security biasing element 124 (e.g., a compression spring) such that the first and second locking pins 111 and 112 can be free to translate between their respective retracted and extended positions. The security latch 123 can be selectively forced into and held in its engaged position by a security bolt 113 that is movable from an unlocked position in which the security latch 123 is movable to its unsecured position and a locked position in which the security bolt 113 is positioned to obstruct movement of the security latch 123 from the secured position. As shown in FIG. 3C, the security bolt 113 can be slidable in a downward direction to press the security latch 123 (e.g., against the biasing force of the security biasing element 124) into engagement with the first locking pin 111. In this downward position, the security bolt 113 physically blocks the security latch 123 from returning to its unsecured position. In some embodiments, the biasing force applied by the security biasing element 124 is selected to be sufficient to prevent the security bolt 113 from moving towards its locked position under its own weight (i.e., by gravitational force alone), but the biasing force applied by the security biasing element 124 can be selected to not be so great that it can move the security bolt 113 from its locked position to its unlocked position without intervention from a user operating the security bolt 113.

As shown in FIG. 2A, the security bolt 113 can be accessible from a cockpit-side face of the panel 110 so that a user can push the panel 110 to its closed position and slide the security bolt 113 to its locked position in a simple manner, perhaps even using one hand. In some embodiments, the security bolt 113 is also accessible from a cabin-side face of the panel 110 so that it can be moved between its unlocked and locked positions from the opposing side of the panel 110. In any arrangement, the first locking pin 111 and the second locking pin 112 cannot be retracted and the panel 110 opened without first returning the security bolt 113 to its unlocked position.

In some embodiments, the security bolt 113 can be coupled to an indicator 114 positioned within the panel 110 and configured to provide a visual indication (e.g., through a window on one or both sides of the panel 110) of the security latch 123 being in either the secured position or in the unsecured position. This indication allows anyone in the passageway 18, the passenger cabin 16, and/or the cockpit 12 (e.g., through a door viewer) to check whether the security bolt 113 is engaged, and whether the panel 110 can be moved to its open position. In the illustrated embodiments, for example, the indicator 114 shows a red symbol when the security bolt 113 is in the unlocked position, and thus the security latch 123 is free to move to the unsecured position. In contrast, when the security bolt 113 is moved to a locked position, forcing the security latch 123 to be in a secured position, the indicator 114 can show a green symbol indicating that the panel 110 is secured in place, with the first locking pin 111 and the second locking pin 112 being secured in their respective extended positions.

Figure 3D:
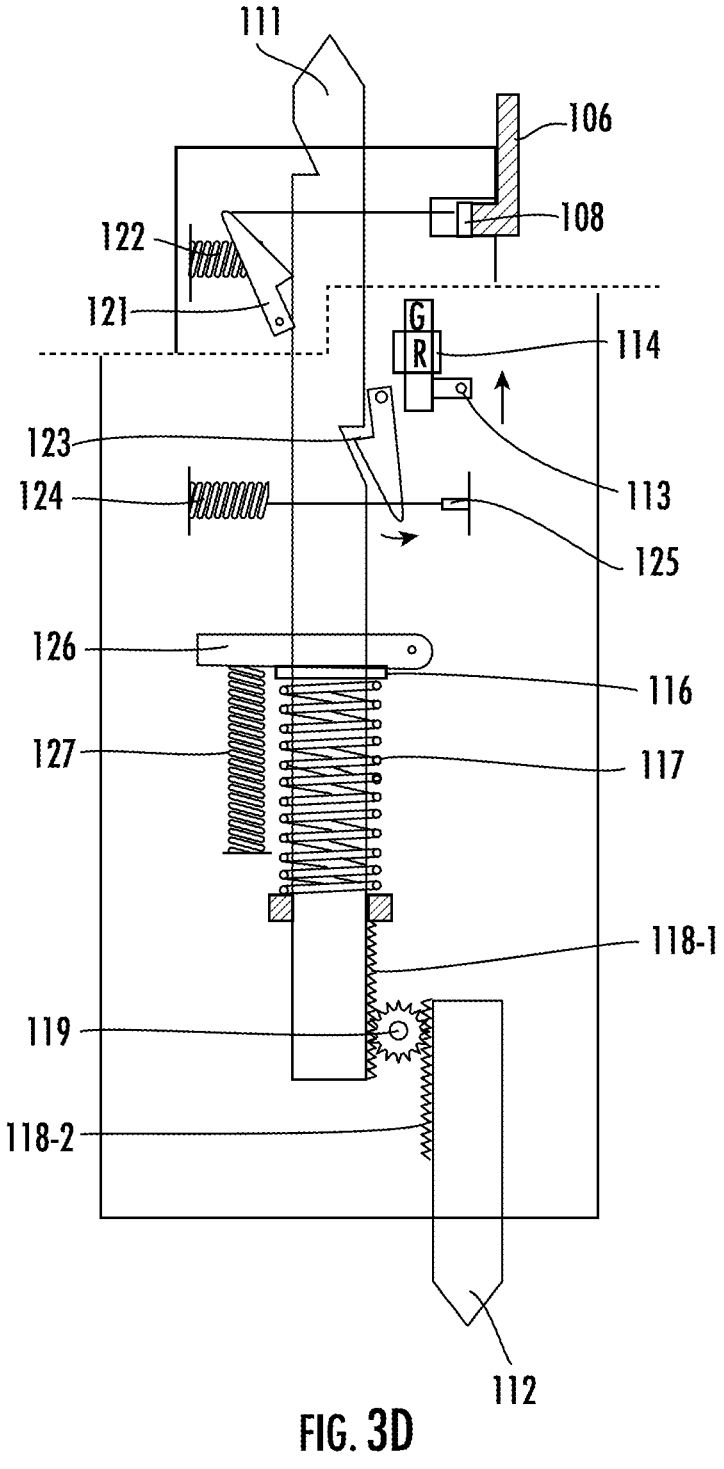
FIG. 3D illustrates a schematic representation of a locking mechanism of a secondary barrier assembly in an unsecured door position in accordance with an embodiment of the presently disclosed subject matter.

When it is desired to open the panel 110, the security bolt 113 can be moved to its unlocked position, such as is shown in FIG. 3D. In this manner, the obstruction of the security latch 123 is removed, and the security biasing element 124 can act to move the security latch 123 from its locked position to its unlocked position, thereby disengaging the security latch 123 from the first locking pin 111 and allowing the first locking pin 111 and the second locking pin 112 to be movable from their respective extended positions. In some embodiments, the indicator 114 can identify this unsecured condition corresponding to the release of the security bolt 113.

In some embodiments, it can be desirable for this unlocking action to be followed by a predetermined time delay before the first locking pin 111 and the second locking pin 112 can be movable from their respective extended positions. Such a time delay can ensure that, once engaged, the barrier assembly 100 can provide an effective secondary barrier for at least a minimum period of time. Referring again to FIG. 3D, such a delay can be effected by coupling a security damper 125 to the security latch 123 that opposes the biasing force applied by the security biasing element 124. In some embodiments, for example, the damper 125 may be implemented in form of a cylinder and piston, in which a fluid, such as oil, has to flow through a small aperture or valve, if the piston is to be moved. By controlling the rate of flow of the fluid (e.g., selecting the size of the aperture), the damping effect and, hence, delay time for the latching clamp to achieve the unlocking state can be set. In this configuration, the security damper 125 slows the return of the security latch 123 from its secured position to its unsecured position. The size and/or configuration of the security damper 125 can be selected to modify the duration of the time delay for this movement of the security latch 123. In some embodiments, for example, the security damper 125 can be configured such that movement of the security latch 123 from its secured position to its unsecured position takes between about 1 second and about 60 seconds, with some preferred embodiments applying a time delay of between about 5 seconds and about 25 seconds and/or between about 5 seconds and about 10 seconds. Therefore, in case the barrier assembly 100 is opened by a person not allowed to enter the secure area, the barrier assembly 100 provides sufficient time to close the cockpit door 14. In addition, it also provides sufficient time for anyone who is in the secure area to leave the secure area.

Figure 3E:
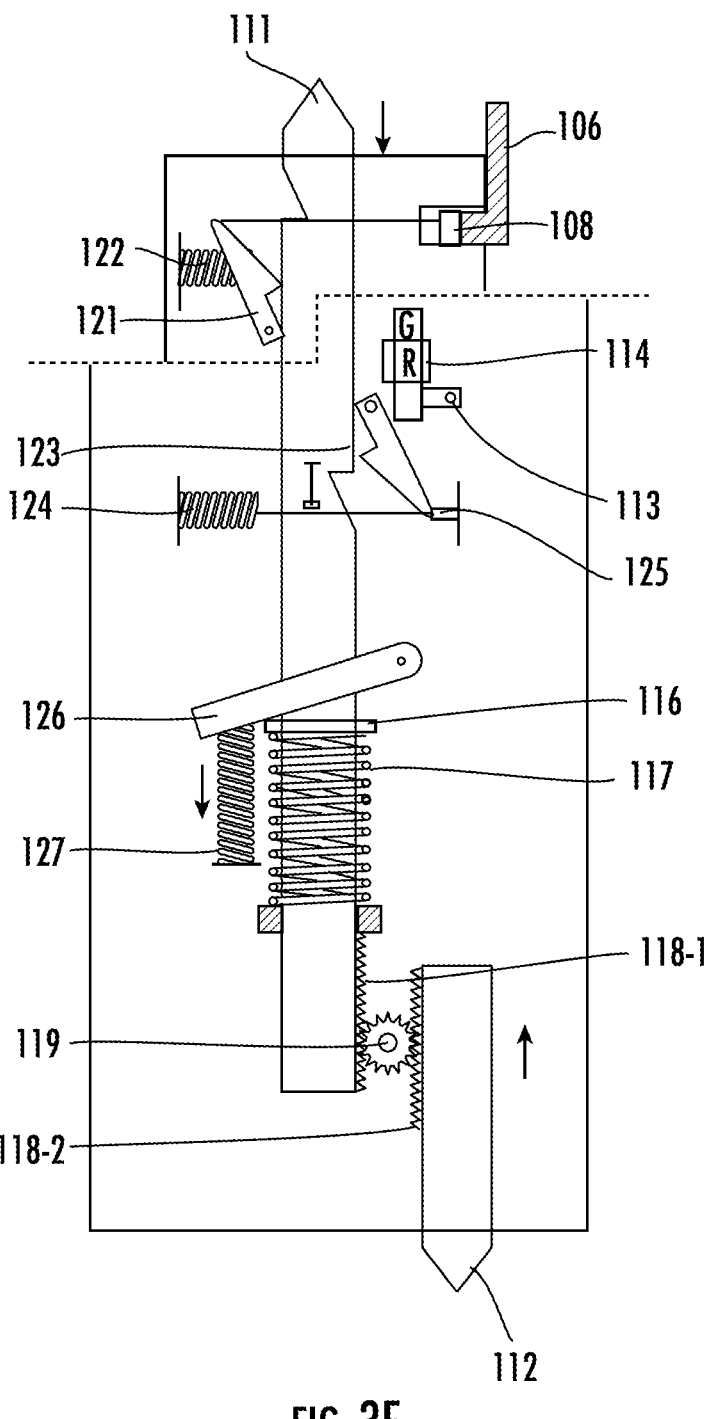
FIG. 3E illustrates a schematic representation of a locking mechanism of a secondary barrier assembly in a manual unlocking operation in accordance with an embodiment of the presently disclosed subject matter.
Figure 3F:
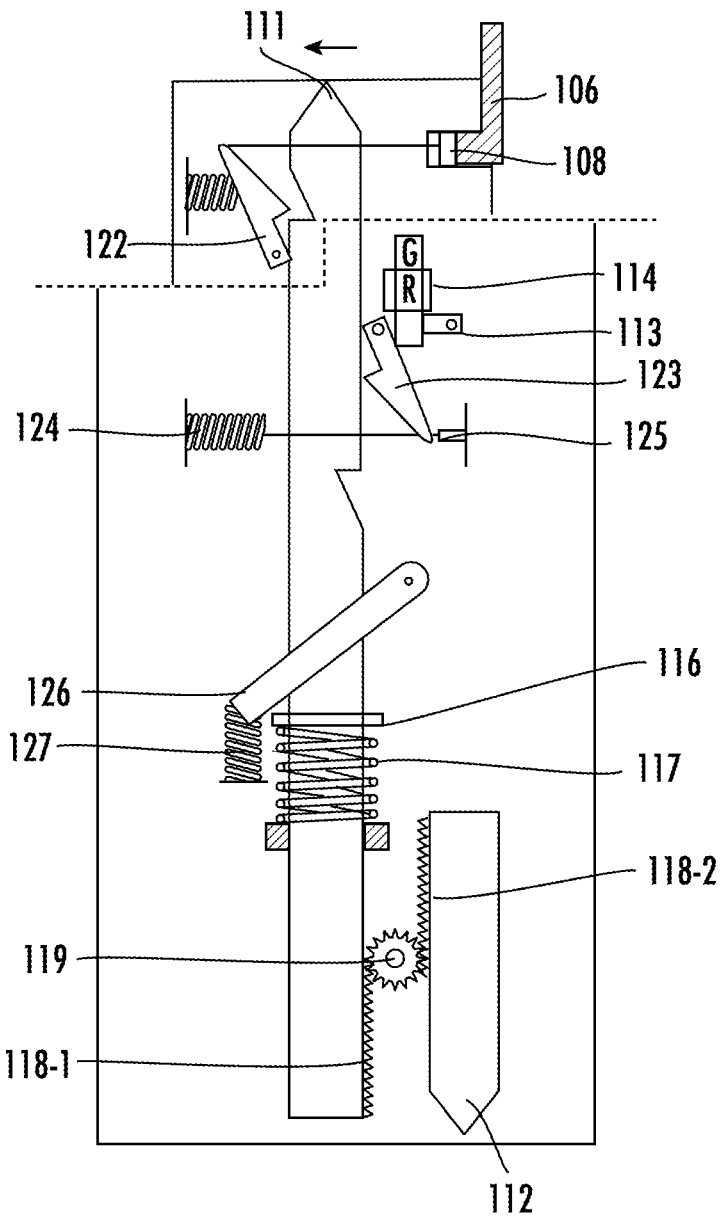
FIG. 3F illustrates a schematic representation of a locking mechanism of a secondary barrier assembly in an unlocked door position in accordance with an embodiment of the presently disclosed subject matter.

As discussed above, once the security latch 123 is returned to the unsecured position, the first locking pin 111 and the second locking pin 112 can be movable from their respective extended positions. As shown in FIGS. 3E and 3F, a door handle assembly 126 provided on one or both sides of the panel 110 can be manipulated to move the first locking pin 111 and the second locking pin 112 back to their respective retracted positions so that the panel 110 can be movable to an open position. In some embodiments, the door handle assembly 126 can be pivotably mounted to the panel 110 and pivotable from to exert a force on the pin flange 116 against the biasing force of the one or more pin biasing element 117. Although the door handle assembly 126 is shown in the illustrated example in the form of a pivoting handle, those having ordinary skill in the art will recognize that any of a variety of other actuator can be used to retract the first and second locking pins 111 and 112, including but not limited to a slide, bolt, or other kind of actuator that can be grabbed and moved by a user. In any configuration, the door handle assembly 126 can be movable between a released position in which movement of the pin flange 116 corresponding to the extension of the first locking pin 111 and the second locking pin 112 to the respective extended positions is unobstructed and a depressed position in which the door handle assembly 126 applies a force to the pin flange 116 to move the first locking pin 111 and the second locking pin 112 towards their retracted positions. In some embodiments, the door handle assembly 126 is biased towards its released position, such as by coupling a handle spring 127 to the door handle assembly 126.

Referring to FIG. 3F, with the door handle assembly 126 in a depressed position such that the first locking pin 111 and the second locking pin 112 are in their respective retracted positions, the panel 110 can be movable from the closed position. In this regard, once the actuator 108 is disengaged from the stopper 106, the release latch 121 can be moved back into engagement with the first locking pin (e.g., by the biasing force applied by release spring 122), and pin biasing element 117 cannot cause the extension of the first locking pin 111 and the second locking pin 112, even if the door handle assembly 126 is moved back to its released position. In this way, the panel 110 can be moved back to its open/stowed position to allow movement into and through the passageway 18. In some embodiments, an additional latch (not shown) coupled to the wall/monument of the passageway 18 can be provided to secure the panel 110 in the open/stowed position.

The present subject matter can be embodied in other forms without departure from the spirit and essential characteristics thereof. The embodiments described therefore are to be considered in all respects as illustrative and not restrictive. While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise.

The invention claimed is:

1. A barrier assembly configured to prevent access to a secure area, the barrier assembly comprising:
    a panel movable between an open position and a closed position in which the panel substantially obstructs a passageway, wherein the panel has a width that is less than a width of the passageway;
    a first locking pin movable between a retracted position within a top edge of the panel and an extended position protruding out of the top edge of the panel, wherein the first locking pin is configured to be secured in a first pin receiver in an upper structural part of the passageway when in the extended position;
    a second locking pin movable between a retracted position within a bottom edge of the panel and an extended position protruding out of the bottom edge of the panel, wherein the second locking pin is configured to be secured in a second pin receiver that is in a lower structural part of the passageway when in the extended position;
    one or more pin biasing element configured to apply a biasing force that urges one or both of the first locking pin or the second locking pin towards the respective extended positions;
    a release latch movable between an engaged position in which the release latch engages one of the first locking pin or the second locking pin to hold the first locking pin and the second locking pin in respective retracted positions against the biasing force and a disengaged position in which the release latch is disengaged from the one of the first locking pin or the second locking pin; and
    an actuator on or within the panel, wherein the actuator is configured to move the release latch to the disengaged position and allow the extension of the first locking pin and the second locking pin to the respective extended positions.

2. The barrier assembly of claim 1, wherein the actuator is configured to trigger extension of the first locking pin and the second locking pin when the actuator contacts a stopper that is in the passageway at a position corresponding to the panel being moved to the closed position.

3. The barrier assembly of claim 1, comprising:
    a security latch movable between a secured position in which the security latch engages one of the first locking pin or the second locking pin to hold the first locking pin and the second locking pin in the respective extended positions and an unsecured position in which the security latch is disengaged from the one of the first locking pin or the second locking pin; and
    a security bolt movable between a locked position in which the security bolt is positioned to obstruct movement of the security latch from the secured position and an unlocked position in which the security latch is movable to the unsecured position.

4. The barrier assembly of claim 3, comprising:
    a security biasing element configured to apply a biasing force that urges the security latch towards the unsecured position; and
    a security damper coupled to the security biasing element and configured to delay movement of the security latch from the secured position to the unsecured position by a predetermined time delay.

5. The barrier assembly of claim 3, comprising an indicator positioned within the panel and coupled to the security bolt, wherein the indicator is configured to provide a visual indication of the security latch being in the secured position or in the unsecured position.

6. The barrier assembly of claim 2, comprising:

a pin flange coupled to one of the first locking pin or the second locking pin; and a door handle assembly coupled to the panel and pivotable between a depressed position in which the door handle assembly applies a force to the pin flange to move the first locking pin and the second locking pin towards the retracted position and a released position in which movement of the pin flange corresponding to the extension of the first locking pin and the second locking pin to the respective extended positions is unobstructed.

7. The barrier assembly of claim 1, wherein the width of the panel is configured to be between about 15 cm and about 18 cm less than a width of the passageway.

8. A method for preventing access to a secure area, the method comprising:

moving a panel to a closed position in which the panel substantially obstructs a passageway, wherein the panel is hingedly connected to a first wall of the passageway; and in response to moving the panel to the closed position:

moving a first locking pin from a retracted position within a top edge of the panel to an extended position protruding out of the top edge of the panel, wherein the first locking pin is secured in a first pin receiver in an upper structural part of the passageway; and moving a second locking pin from a retracted position within a bottom edge of the panel to an extended position protruding out of the bottom edge of the panel, wherein the second locking pin is secured in a second pin receiver that is in a lower structural part of the passageway;

wherein the panel has a width that is less than a width of the passageway such that, when the panel is in the closed position, the first locking pin is secured in the first pin receiver, and the second locking pin is secured in the second pin receiver, an edge of the panel is spaced apart by a gap from a second wall of the passageway opposing the first wall;

wherein moving the first locking pin and the second locking pin to respective extended positions is triggered by contacting an actuator on or within the panel with a stopper that is in the passageway at a position corresponding to the panel being in the closed position; and wherein moving the first locking pin and the second locking pin to respective extended positions comprises:

upon contacting the actuator with the stopper, moving a release latch from an engaged position in which the release latch engages one of the first locking pin or the second locking pin to hold the first locking pin and the second locking pin in respective retracted positions to a disengaged position in which the release latch is disengaged from the one of the first locking pin or the second locking pin; and applying a biasing force that urges one or both of the first locking pin or the second locking pin towards the respective extended positions.

9. The method of claim 8, comprising securing the first locking pin and the second locking pin in the respective extended positions by:

moving a security latch from an unsecured position in which the security latch is disengaged from one of the first locking pin or the second locking pin to a secured position in which the security latch engages the one of the first locking pin or the second locking pin to hold the first locking pin and the second locking pin in the respective extended positions; and moving a security bolt from an unlocked position in which the security latch is movable to the unsecured position to a locked position in which the security bolt is positioned to obstruct movement of the security latch from the secured position.

10. The method of claim 9, comprising releasing the security latch by applying a biasing force that urges the security latch towards the unsecured position;

wherein the biasing force is at least partially opposed by a security damper that delays movement of the security latch from the secured position to the unsecured position by a predetermined time delay.

11. The method of claim 9, comprising providing a visual indication of the security latch being in the secured position or in the unsecured position.

12. The method of claim 8, comprising retracting the first locking pin and the second locking pin by moving a door handle assembly coupled to the panel to a depressed position in which the door handle assembly applies a force to one of the first locking pin or the second locking pin to move the first locking pin and the second locking pin towards the retracted position.

13. The method of claim 8, wherein when the panel is in the closed position, the edge of the panel is spaced apart from a second wall of the passageway panel by a gap of between about 15 cm and about 18 cm.

* * * * *